(12) United States Patent
Wang et al.

(10) Patent No.: US 10,498,506 B2
(45) Date of Patent: Dec. 3, 2019

(54) FLEXIBLE COMB-BASED REFERENCE SIGNALS

(71) Applicant: QUALCOMM Incorporated, San Diego, CA (US)

(72) Inventors: Renqiu Wang, San Diego, CA (US); Yi Huang, San Diego, CA (US); Hao Xu, Beijing (CN); Wei Zeng, Saratoga, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 15/874,712

(22) Filed: Jan. 18, 2018

(65) Prior Publication Data
US 2018/0212728 A1 Jul. 26, 2018

Related U.S. Application Data

(60) Provisional application No. 62/450,943, filed on Jan. 26, 2017.

(51) Int. Cl.
*H04W 72/14* (2009.01)
*H04L 5/00* (2006.01)
(Continued)

(52) U.S. Cl.
CPC ......... *H04L 5/0048* (2013.01); *H04B 7/0413* (2013.01); *H04B 7/0684* (2013.01);
(Continued)

(58) Field of Classification Search
CPC .... H04W 72/14; H04L 5/0023; H04L 5/0091; H04B 7/0413; H04B 7/0684
See application file for complete search history.

(56) References Cited

U.S. PATENT DOCUMENTS

| 9,572,063 B2* | 2/2017 | Etemad ................... H04W 4/70 |
| 2011/0261716 A1 | 10/2011 | Kim et al. |

(Continued)

FOREIGN PATENT DOCUMENTS

| EP | 2775759 A1 | 9/2014 |
| WO | WO2014077742 A1 | 5/2014 |
| WO | WO2017119921 A1 | 7/2017 |

OTHER PUBLICATIONS

International Search Report and Written Opinion—PCT/US2018/014487—ISA/EPO—dated Jun. 13, 2018.

*Primary Examiner* — Wei Zhao
(74) *Attorney, Agent, or Firm* — Holland & Hart LLP

(57) ABSTRACT

Multiple-input, multiple-output (MIMO) devices and non-MIMO devices may implement a flexible comb-based design for transmission of reference signals, such as demodulation reference signals (DMRSs). User equipment (UEs) of different ranks may use the flexible comb-based design to transmit the reference signals in a common comb pattern within an allocated bandwidth. UEs using as many antenna ports as combs in the common comb pattern may transmit a different reference signal using a different antenna port over each comb, while UEs using fewer antenna ports than combs may concatenate combs, so that the UEs may transmit a reference signal using a single antenna port over multiple combs. Using the flexible comb-based design, a base station may be capable of better manage inter-cell interference and multiplexing of different rank UEs in shared resource blocks (RBs) may be supported.

30 Claims, 11 Drawing Sheets

(51) Int. Cl.
    *H04B 7/0413*     (2017.01)
    *H04B 7/06*     (2006.01)
    *H04B 7/0404*     (2017.01)
    *H04L 5/14*     (2006.01)

(52) U.S. Cl.
    CPC .......... *H04L 5/0023* (2013.01); *H04L 5/0091* (2013.01); *H04W 72/14* (2013.01); *H04B 7/0404* (2013.01); *H04L 5/001* (2013.01); *H04L 5/14* (2013.01)

(56) References Cited

U.S. PATENT DOCUMENTS

2013/0170435 A1*   7/2013   Dinan ..................... H04L 45/50
                                                            370/328
2014/0241284 A1    8/2014   Zhou
2015/0312009 A1   10/2015   Nissila et al.
2018/0020441 A1*   1/2018   Lo ......................... H04W 76/14

\* cited by examiner

FLEXIBLE COMB-BASED REFERENCE SIGNALS

CROSS REFERENCES

The present Application for Patent claims priority to U.S. Provisional Patent Application No. 62/450,943 by Wang et al., entitled "Flexible Comb-Based Reference Signals," filed Jan. 26, 2017, which is assigned to the assignee hereof and expressly incorporated by reference herein.

BACKGROUND

The following relates generally to wireless communication, and more specifically to flexible comb-based reference signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, that may be otherwise known as user equipment (UE).

In some wireless communications systems, such as LTE or LTE-Advanced (LTE-A), an uplink demodulation reference signal (DMRS) is transmitted by a UE to a base station via a physical uplink control channel (PUCCH) or physical uplink shared channel (PUSCH). The base station may estimate channel parameters based on the received DMRS. The uplink DMRS may occupy all tones (i.e., subcarriers) of an allocated bandwidth for the transmission. If a UE is transmitting using the PUCCH, the UE may implement a computer generated sequence to transmit the DMRS. However, some devices (e.g., multiple-input, multiple-output (MIMO) devices) may not support transmission of a DMRS using the PUCCH.

SUMMARY

The described techniques relate to improved methods, systems, devices, or apparatuses that support flexible comb-based reference signals. Generally, the described techniques provide for the communication of reference signals between two wireless devices in a wireless communications system according to a multi-comb pattern. The multi-comb pattern may include one or more combs (where a comb refers to a set of evenly spaced subcarriers of a bandwidth allocated for transmission of reference signals) and may be utilized by a user equipment (UE) during the exchange of one or more reference signals with a base station. For example, a UE capable of communicating using multiple antenna ports may transmit a reference signal (e.g., a demodulation reference signal (DMRS)) over each of the multiple antenna ports to the base station. In some cases, the DMRS may be different for each antenna port and each antenna port may utilize at least one comb of the multi-comb pattern. Thus, according to some aspects, regardless of the rank associated with the UE, DMRSs may be transmitted by using at least a subset of the combs of the multi-comb pattern for transmission by each antenna port of the UE.

A method of wireless communication is described. The method may include identifying a number of antenna ports to use for transmission of one or more reference signals in a symbol having a multiple-comb pattern, each comb of the multiple-comb pattern comprising a set of evenly spaced subcarriers within a set of resources allocated for reference signal transmission, determining, for each antenna port, a number of combs to use for transmission of at least one of the one or more reference signals based at least in part on the number of antenna ports, and transmitting, using each antenna port, at least one of the one or more reference signals based at least in part on the determined number of combs.

An apparatus for wireless communication is described. The apparatus may include means for identifying a number of antenna ports to use for transmission of one or more reference signals in a symbol having a multiple-comb pattern, each comb of the multiple-comb pattern comprising a set of evenly spaced subcarriers within a set of resources allocated for reference signal transmission, means for determining, for each antenna port, a number of combs to use for transmission of at least one of the one or more reference signals based at least in part on the number of antenna ports, and means for transmitting, using each antenna port, at least one of the one or more reference signals based at least in part on the determined number of combs.

Another apparatus for wireless communication is described. The apparatus may include a processor, memory in electronic communication with the processor, and instructions stored in the memory. The instructions may be operable to cause the processor to identify a number of antenna ports to use for transmission of one or more reference signals in a symbol having a multiple-comb pattern, each comb of the multiple-comb pattern comprising a set of subcarriers within a set of resources allocated for reference signal transmission, determine, for each antenna port, a number of combs to use for transmission of at least one of the one or more reference signals based at least in part on the number of antenna ports, and transmit, using each antenna port, at least one of the one or more reference signals based at least in part on the determined number of combs.

A non-transitory computer readable medium for wireless communication is described. The non-transitory computer-readable medium may include instructions operable to cause a processor to identify a number of antenna ports to use for transmission of one or more reference signals in a symbol having a multiple-comb pattern, each comb of the multiple-comb pattern comprising a set of evenly spaced subcarriers within a set of resources allocated for reference signal transmission, determine, for each antenna port, a number of combs to use for transmission of at least one of the one or more reference signals based at least in part on the number of antenna ports, and transmit, using each antenna port, at least one of the one or more reference signals based at least in part on the determined number of combs.

Some examples of the method, apparatus, and non-transitory computer-readable medium described above may further include processes, features, means, or instructions for receiving, from a base station, a scheduling grant comprising an antenna index and a comb index. Some examples of the method, apparatus, and non-transitory computer-readable medium described above may further include processes, features, means, or instructions for transmitting at least one of the one or more reference signals based at least in part on the antenna index and the comb index.

Some examples of the method, apparatus, and non-transitory computer-readable medium described above may further include processes, features, means, or instructions for determining an antenna index and a comb index for a UE. Some examples of the method, apparatus, and non-transitory computer-readable medium described above may further include processes, features, means, or instructions for transmitting, to the UE, a scheduling grant comprising the antenna index and the comb index.

In some examples of the method, apparatus, and non-transitory computer-readable medium described above, transmitting the at least one of the one or more reference signals comprises: determining that the number of antenna ports may be equal to a number of combs in the multiple-comb pattern. Some examples of the method, apparatus, and non-transitory computer-readable medium described above may further include processes, features, means, or instructions for allocating each comb of the multiple-comb pattern to a respective antenna port. Some examples of the method, apparatus, and non-transitory computer-readable medium described above may further include processes, features, means, or instructions for transmitting the at least one of the one or more reference signals based at least in part on the allocating.

In some examples of the method, apparatus, and non-transitory computer-readable medium described above, transmitting the at least one of the one or more reference signals comprises: determining that the number of antenna ports may be equal to one half of a number of combs in the multiple-comb pattern. Some examples of the method, apparatus, and non-transitory computer-readable medium described above may further include processes, features, means, or instructions for allocating every other comb of the multiple-comb pattern to a respective antenna port. Some examples of the method, apparatus, and non-transitory computer-readable medium described above may further include processes, features, means, or instructions for transmitting the at least one of the one or more reference signals based at least in part on the allocating.

In some examples of the method, apparatus, and non-transitory computer-readable medium described above, transmitting the at least one of the one or more reference signals comprises: determining that the number of antenna ports may be equal to one. Some examples of the method, apparatus, and non-transitory computer-readable medium described above may further include processes, features, means, or instructions for allocating every comb of the multiple-comb pattern to a single antenna port. Some examples of the method, apparatus, and non-transitory computer-readable medium described above may further include processes, features, means, or instructions for transmitting the at least one of the one or more reference signals based at least in part on the allocating.

In some examples of the method, apparatus, and non-transitory computer-readable medium described above, transmitting the at least one of the one or more reference signals comprises: transmitting, at a first antenna port, a first reference signal using a first comb of the multiple-comb pattern. Some examples of the method, apparatus, and non-transitory computer-readable medium described above may further include processes, features, means, or instructions for transmitting, at a second antenna port, a second reference signal using a second comb of the multiple-comb pattern.

In some examples of the method, apparatus, and non-transitory computer-readable medium described above, the first reference signal comprises a first sub-sequence of a base sequence and the second reference signal comprises a second sub-sequence of the base sequence.

In some examples of the method, apparatus, and non-transitory computer-readable medium described above, the base sequence consists of the first sub-sequence and the second sub-sequence.

In some examples of the method, apparatus, and non-transitory computer-readable medium described above, transmitting the at least one of the one or more reference signals comprises: transmitting a first reference signal using a subset of combs of the multiple-comb pattern.

In some examples of the method, apparatus, and non-transitory computer-readable medium described above, a first set of subcarriers for a first comb of the multiple-comb pattern may be non-overlapping with a second set of subcarriers for a second comb of the multiple-comb pattern.

In some examples of the method, apparatus, and non-transitory computer-readable medium described above, the multiple-comb pattern comprises multiple combs that may be frequency multiplexed across one or more symbol periods.

Some examples of the method, apparatus, and non-transitory computer-readable medium described above may further include processes, features, means, or instructions for allocating the set of resources to multiple UEs including a first UE and a second UE different from the first UE.

In some examples of the method, apparatus, and non-transitory computer-readable medium described above, a determined number of combs for each antenna port of the first UE may be equal to or different from a determined number of combs for each antenna port of the second UE.

DETAILED DESCRIPTION

In some wireless communications systems, an uplink demodulation reference signal (DMRS) is transmitted by a user equipment (UE) to a base station via a physical uplink control channel (PUCCH) or physical uplink shared channel (PUSCH). In some cases, the UE may be an example of a multiple-input, multiple-output (MIMO) device, capable of utilizing multiple antenna ports for transmission or reception. For example, a MIMO device may transmit a DMRS from each antenna port to the base station, and the base station may estimate different channel conditions based on each DMRS. When utilizing multiple antenna ports, channel conditions (e.g., estimated by a base station) may be different depending on the antenna port used by the UE for transmission of the reference signal. To reduce interference and in order to support spatial multiplexing, the MIMO device may implement a Zadoff Chu sequence to transmit each DMRS orthogonally. Further, in some cases, the base station may assign a cyclic shift (CS), an orthogonal cover code (OCC), or both to the UE to set the orthogonality of the DMRS transmissions in an attempt to further reduce interference.

According to some aspects, MIMO devices and non-MIMO devices may implement a flexible comb-based design for transmission of reference signals, such as DMRSs. UEs of different ranks may use the flexible comb-based design to transmit the reference signals in a common comb pattern within a bandwidth allocated for transmission of one or more reference signals. UEs using as many antenna ports as combs in the common comb pattern may transmit a different reference signal using a different antenna port over each comb, while UEs using fewer antenna ports than combs may concatenate combs, such that the UEs transmit a reference signal using a single antenna port over multiple combs. Such techniques may allow a base station to multiplex different rank UEs in shared resource blocks (RBs) while also managing inter-cell interference.

Aspects of the disclosure are initially described in the context of wireless communications systems. Exemplary wireless devices (e.g., UEs or base stations), resource structures, and process flows for flexible comb-based reference signals are then described. Aspects of the disclosure are further illustrated by and described with reference to apparatus diagrams, system diagrams, and flowcharts that relate to flexible comb-based reference signals.

Figure 1:
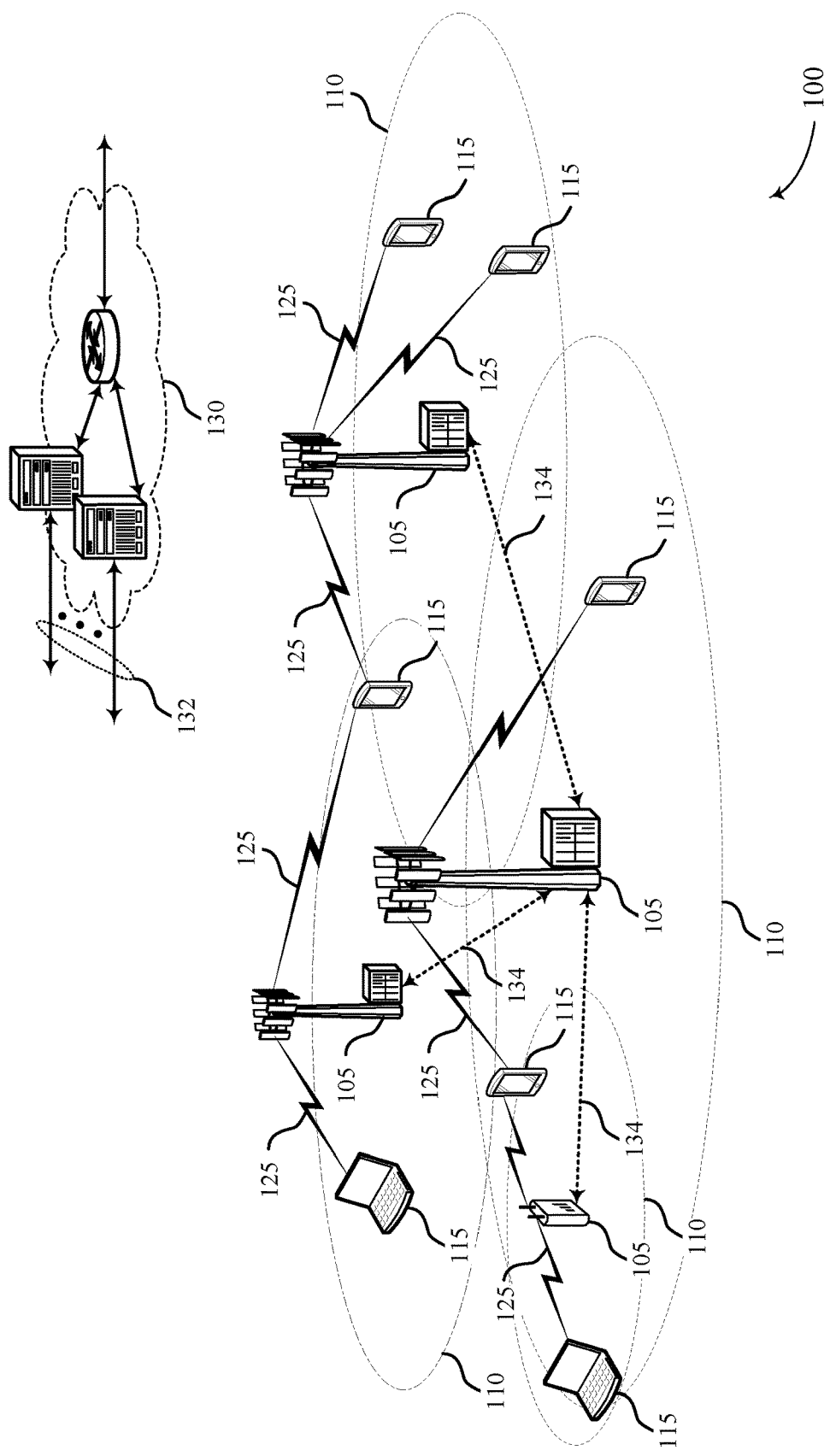
FIG. 1 illustrates an example of a system for wireless communication that supports flexible comb-based reference signals in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a long term evolution (LTE), LTE-Advanced (LTE-A), or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support transmissions of reference signals between UEs 115 and base stations 105. In some cases, one or more UEs 115 or base stations 105 may be examples of MIMO devices, and may transmit using one or more antenna ports. In such instances, the UEs 115 and base stations 105 may implement a flexible comb-based design for reference signal transmissions, so that the transmissions share a common comb pattern.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques.

Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), that may include at least one mobility management entity (MME), at least one serving gateway (S-GW), and at least one packet data network (PDN) gateway (P-GW). The MME may be the control node that processes the signaling between the UE 115 and the EPC. All user internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

Wireless communications system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (that may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

MIMO wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, that may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the Physical Layer (PHY), transport channels may be mapped to physical channels.

Wireless communications system 100 may support operation on multiple cells or carriers, a feature that may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for CA. CA may be used with both frequency division duplex (FDD) and time division duplex (TDD) component carriers.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

In some cases, a UE 115 may include more than one antenna port to use for transmission and reception and such a UE 115 may be referred to as a MIMO device. Channel conditions may be different depending on which of these antenna ports the UE 115 uses for transmission to a base station 105. Therefore, UE 115 may transmit a different reference signal for each of these antenna ports to the base station 105, and the base station 105 may perform channel estimation with each antenna port based on the different reference signals. UEs 115 using different numbers of antenna ports for transmission of reference signals may implement a flexible comb-based design to transmit the reference signals in a common format to the base station 105-a.

Figure 2:
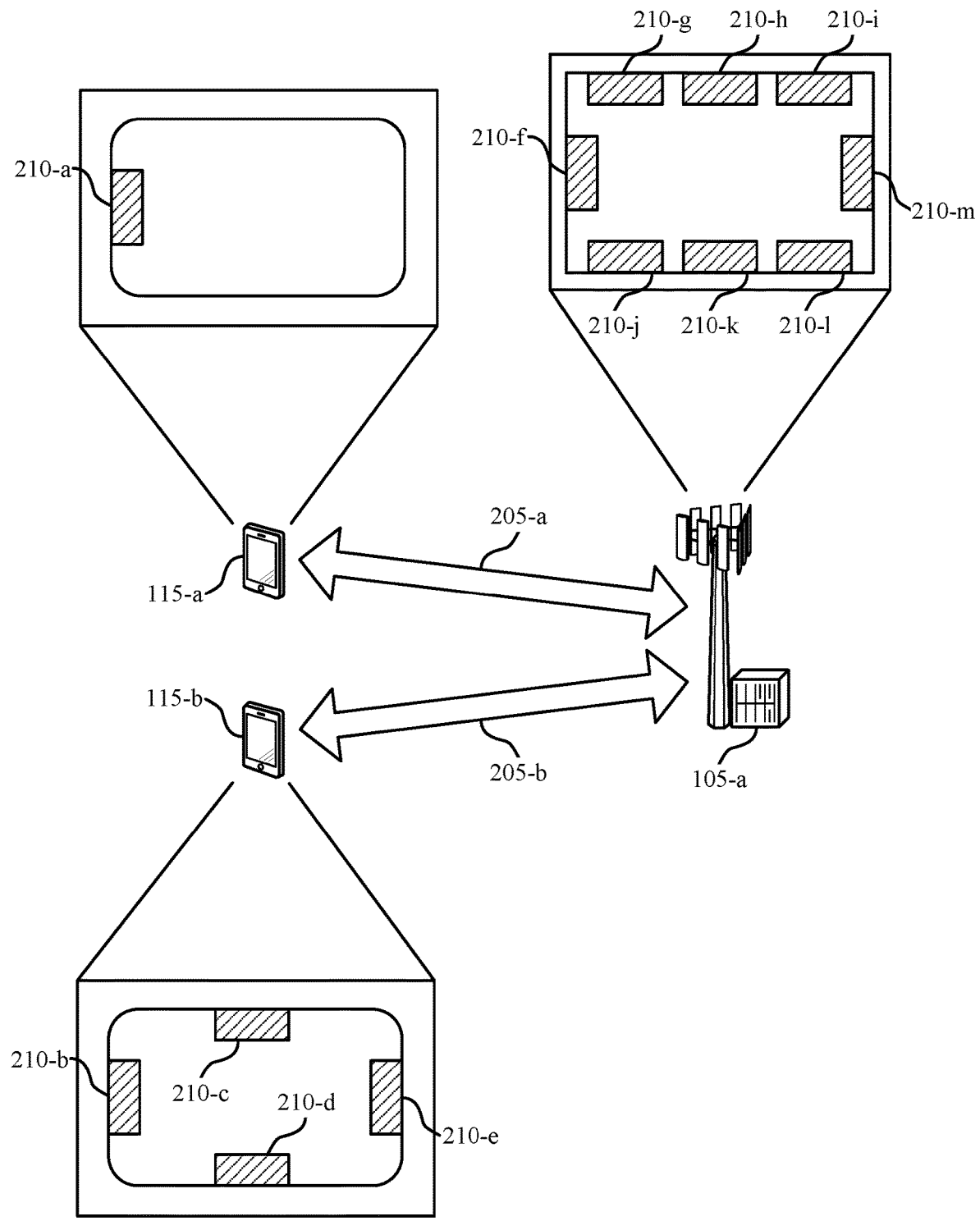
FIG. 2 illustrates an example of a wireless communications system that supports flexible comb-based reference signals in accordance with aspects of the present disclosure.

FIG. 2 illustrates an example of a wireless communications system 200 that supports flexible comb-based reference signals in accordance with various aspects of the present disclosure. Wireless communications system 200 may include base station 105-a and UEs 115-a and 115-b, which may be examples of a base station 105 and UEs 115 as described with reference to FIG. 1. UEs 115-a and 115-b may communicate with base station 105-a over communication links 205-a and 205-b, respectively. Communications between the UEs 115 and the base station 105 may include reference signals (e.g., DMRSs, sounding reference signals (SRSs), cell specific reference signals, UE specific reference signals, multimedia broadcast/multicast service (MBMS) signals, etc.). In some cases, a UE 115 or a base station 105 may be an example of a MIMO device that supports communication using multiple physical antennas and/or multiple antenna ports. In some cases, wireless communications system 200 may implement flexible comb-based reference signal transmission so that UEs 115 of different ranks may transmit or receive reference signals using a common comb pattern.

Some wireless systems (e.g., NR wireless systems) may support communication with MIMO devices in both uplink and downlink directions by utilizing cyclic prefix orthogonal frequency division multiplexing (CP-OFDM) waveforms. In some cases, base station 105-a may communicate with both MIMO devices and non-MIMO devices simultaneously. For example, base station 105-a may communicate with both UE 115-a over communication link 205-a and UE 115-b over communication link 205-b. As shown, UE 115-a may be an example of a non-MIMO device (i.e., UE 115-a may include a single antenna port 210-a for communication), while UE 115-b may be an example of a MIMO device (e.g., UE 115-b may include antenna ports 210-b, 210-c, 210-d, and 210-e). In this case, UE 115-a may be referred to as a rank 1 UE 115 that may communicate over 1 layer, and UE 115-b may be referred to as a rank 4 UE 115 that may communicate over 4 layers. Additionally, base station 105-a may include multiple antenna ports, such as antenna ports 210-f, 210-g, 210-h, 210-i, 210-j, 210-k, 210-l, and 210-m.

UEs 115-a and 115-b as well as base station 105-a may use a flexible comb-based design for transmission of reference signals. A comb-based design may include an arrangement of subcarriers or tones to use for transmission within a bandwidth allocated for communication of one or more reference signals. In some examples, the subcarriers or tones may be evenly spaced. The comb-based design may include one or more combs, which may each include a set of subcarriers over which an antenna port 210 may transmit a reference signal. In a comb-based design, the combs are dispersed (e.g., evenly) throughout the bandwidth. For example, in a comb-based design including two combs, one comb may include even numbered subcarriers within the bandwidth, and the other comb may include odd numbered subcarriers. A comb-based design implemented by UEs 115 using different numbers of antenna ports 210 (e.g., UEs 115-a and 115-b) may be referred to as a flexible comb-based design and a comb-based design may include a multi-comb pattern, that may be common to UEs 115 of different ranks.

UEs 115-a and 115-b may use the flexible comb-based design to transmit a reference signal via each antenna port 210 to base station 105-a. For example, UE 115-a may use antenna port 210-a to transmit a reference signal over every comb of a multi-comb pattern to base station 105-a and UE 115-b may use each of antenna ports 210-b, 210-c, 210-d, and 210-e to transmit different reference signals to base station 105-a, where each antenna port 210 transmits a different reference signal over a respective combs of the flexible comb-based design. In this way, base station 105-a may receive reference signals from both the rank 1 UE 115-a and the rank 4 UE 115-b through the use of a common comb pattern.

Figure 3:
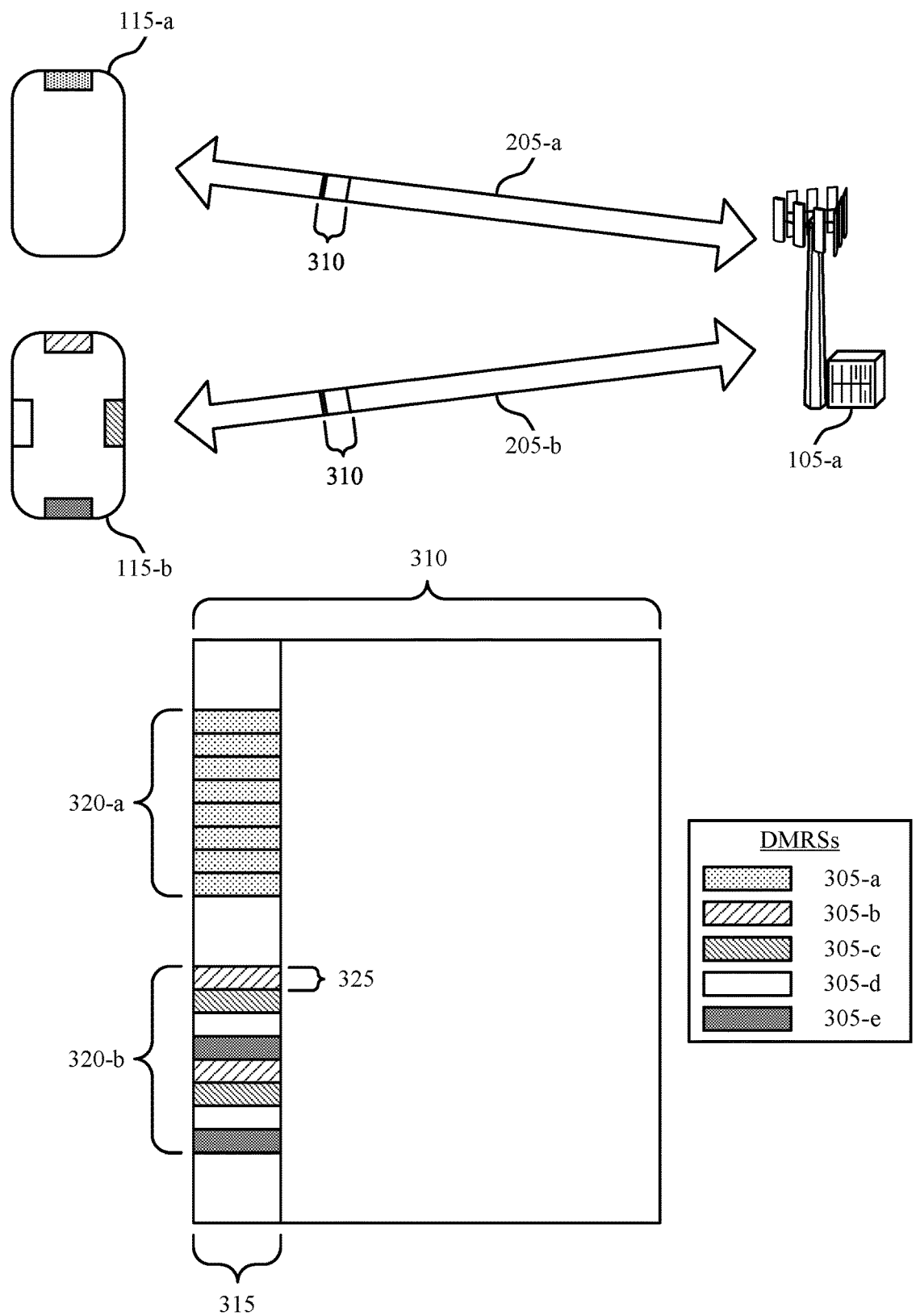
FIG. 3 illustrates an example of a wireless communications system that supports flexible comb-based reference signals in accordance with aspects of the present disclosure.

FIG. 3 illustrates an example of a wireless communications system 300 for DMRS transmission that supports flexible comb-based reference signals in accordance with various aspects of the present disclosure. Wireless communications system 300 may include base station 105-a, UE 115-a and UE 115-b, that may be examples of the corresponding devices as described with reference to FIGS. 1 and 2. UEs 115-a and 115-b may communicate with base station 105-a over communication links 205-a and 205-b, respectively, that may be examples of the corresponding communication links described with reference to FIG. 2. According to some aspects, UEs 115-a and 115-b may transmit DMRSs 305 to base station 105-a using a flexible comb-based design.

Wireless communications system 300 may support uplink and downlink transmission of reference signals for MIMO devices. For example, in the uplink, a UE 115 may transmit a DMRS 305 spanning a single symbol 315 per slot 310 over a communication link 205. In some cases, a DMRS may span multiple symbols and a UE 115 may frontload the DMRS 305 in the slot 310 (e.g., by transmitting the DMRS 305 in the first symbol 315 of the slot 310). Due to the UE 115 frontloading the DMRS 305, a base station 105 may estimate channel conditions and begin demodulating and decoding the transmission earlier (e.g., immediately following or shortly after reception of the DMRS 305. In some cases, the UE may transmit a DMRS 305 in one or more symbols following a control region (e.g., a region allocated for a physical downlink control channel (PDCCH) or other control channels).

The UE 115 may implement a multi-comb pattern for DMRS 305 transmission to the base station 105. The multi-comb pattern may involve the UE 115 transmitting one or more DMRSs 305 using one or more combs of the multi-comb pattern. As such, a comb may refer to a set of tones over which the UE 115 transmits a DMRS 305 (e.g., to the base station 105). The number of antenna ports the UE 115 uses for transmission may be indicated by the rank of the UE 115 or the number of layers of the UE 115. For example, UE 115-b may be a MIMO device of rank 4, and may correspondingly use 4 layers or 4 antenna ports for transmission. Using the multi-comb pattern, UE 115-b may transmit a different DMRS 305 from each antenna port to the base station 105. In some cases, each of the different DMRSs 305 (e.g., DMRSs 305-b, 305-c, 305-d, and 305-e) may be transmitted on alternating tones 325. For example, UE 115-b may transmit a different DMRS 305 in every fourth tone 325. By using a first antenna port, UE 115-b may transmit DMRS 305-b in the first tone 325, the fifth tone 325, the ninth tone 325, etc. Using a second antenna port, UE 115-*b* may transmit DMRS 305-*c* in the second tone 325, the sixth tone 325, the tenth tone 325, etc. Similarly, UE 115-*b* may transmit DMRSs 305-*d* and 305-*e* using a third and a fourth antenna port over respective tones.

According to some aspects, base station 105-*a* may allocate bandwidth 320 to each UE 115 for reference signal transmission regardless of the rank of the UE 115. For example, a rank 1 UE 115 (e.g., UE 115-*a*) and a rank 4 UE 115 (e.g., UE 115-*b*) may both be allocated equal bandwidth 320 (e.g., bandwidth 320-*a* for UE 115-*a* and bandwidth 320-*b* for UE 115-*b*) for DMRS 305 transmission. In such instances, UE 115-*a* transmitting a DMRS 305 to base station 105-*a* may transmit using one antenna port and in one comb of a one comb pattern. Therefore, UE 115-*a* may transmit DMRS 305-*a* over all tones 325 of the allocated bandwidth 320-*a*. A rank 4 UE 115, such as UE 115-*b*, transmitting a DMRS 305 to base station 105 may transmit a different DMRS 305 in each comb of a four comb pattern as the UE 115-*b* may utilize four antenna ports for transmission. In such instances, the UE 115-*b* may transmit DMRS 305-*b* in every fourth tone 325 of allocated bandwidth 320-*b* beginning at the first tone 325, DMRS 305-*c* in every fourth tone 325 of allocated bandwidth 320-*b* beginning at the second tone 325, and so on. Therefore, UE 115-*b* may transmit each DMRS 305 over one quarter of the total tones 325 within the allocated RBs. Using such techniques, the greater the number of combs used for transmission, the lower the DMRS 305 density.

In a non-flexible comb-based design, UEs 115 of different ranks may use different comb patterns. For example, a rank 1 UE 115 may use a one comb pattern, a rank 2 UE 115 may use a two comb pattern, and a rank 4 UE 115 may use a four comb pattern. In some cases, patterns with more than four combs may result in a DMRS 305 density lower than a desired DMRS 305 density threshold. In some cases, a UE 115 with a rank greater than 4 may have more than one symbol 315 per slot 310 allocated for DMRS 305 transmission. For example, a rank 8 UE 115 may use a four comb pattern over two symbols 315 (e.g., four antenna ports may transmit one or more DMRSs 305 in the first symbol 315, and the other four antenna ports may transmit one or more DMRSs 305 in the second symbol 315). A two symbol 315 OCC may be used for orthogonality. In other cases, a rank 8 UE 115 may use a four comb pattern over one symbol 315. The rank 8 UE 115 may use CSs to multiplex two antenna ports within each comb of the four comb pattern for orthogonality.

The UEs 115-*a* and 115-*b* may utilize a flexible comb-based design to transmit DMRS 305 using a common comb pattern. The UEs 115 may use a comb pattern with more combs than necessary, and UEs 115 of lower ranks may fall back by compacting combs. For example, the UEs 115 may use a four comb pattern for DMRS 305 transmission to base station 105-*a*. A UE 115 of rank 4, such as UE 115-*b*, may transmit a DMRS 305 for each of its four antenna ports, where each antenna port transmits using a different comb. However, a UE 115 of rank 2 may transmit a DMRS 305 for each of its two antenna ports, where one antenna port uses the first and third combs, and the other antenna port uses the second and fourth combs. This may be referred to as compacting the first and third combs, and compacting the second and fourth combs. Similarly, a UE 115 of rank 1, such as UE 115-*a*, may transmit a DMRS 305 for its single antenna port using all four combs. In this way, the UEs 115 of each rank will be capable of transmission regardless of rank by transmitting according to the common comb pattern.

If a single antenna port transmits a DMRS 305 using multiple combs, base station 105-*a* may perform joint channel estimation based on the DMRS 305 received over the multiple combs to estimate the channel conditions.

Base station 105-*a* may construct a wideband sequence for use by one or more UEs 115 during DMRS 305 transmission. In some cases, the wideband sequence may be a single long sequence. In other cases, the wideband sequence may be a concatenation of multiple short sequences. Base station 105-*a* may allocate a bandwidth 320 of the wideband sequence to each UE 115. For example, the wideband sequence may span 100 RBs, and a single UE 115 may be allocated a 10 RB bandwidth 320 of the wideband sequence. The UE 115 may transmit associated one or more DMRSs 305 within the allocated bandwidth 320 using the flexible comb-based design. For example, a rank 2 UE 115 may transmit two different DMRSs 305, each at alternating tones 325 within the 10 RB bandwidth 320. One DMRS 305 is therefore using a subset of the wideband sequence corresponding to the allocated RBs and combs. A UE 115 may additionally implement a scrambling sequence to modify its transmission to base station 105-*a*. The scrambling sequence may be independent of the comb pattern used by the UE 115.

Using the flexible comb-based design may allow for better inter-cell interference management than a non-flexible comb-based design. For example, a base station 105 does not need to determine which comb pattern nearby UEs 115 are transmitting with because all UEs 115 transmit using a common comb pattern. In a system using different comb patterns for different ranked UEs 115, the base station 105 may estimate interference for each of the different comb patterns, and then determine which of the estimates is most probable. In a system with a flexible comb-based design, the base station 105 (e.g., base station 105-*a*) may estimate interference based on the comb pattern common to all UEs 115, and thus may save processing time and power. Base station 105-*a* may perform interference estimation separately for each received comb.

Additionally, the system utilizing the flexible comb-based design may multiplex UEs 115 of different ranks (e.g., UEs 115-*a* and 115-*b*) in the same RBs, due to UEs 115 of different ranks transmitting DMRSs 305 using the common comb pattern. When UEs 115 of different ranks are multiplexed, the UEs 115 may only perform orthogonal transmissions on a per comb basis. In this case, base station 105-*a* may process the transmission on a per comb basis.

In some cases, a MIMO device may only use a subset of its antenna ports. For example, a UE 115 may have eight antennas, but may only transmit DMRS 305 using a subset (e.g., two, four, six) of the eight antennas. Additionally, a UE 115 may transmit multiple combs per antenna port. In some cases, a base station 105 may determine an antenna index or comb index for one or more UEs, that may be transmitted to the one or more UEs in a scheduling grant or through other signaling. The antenna index and the comb index may indicate, to the UE, which antenna or antenna port to use and the corresponding comb for a given antenna or antenna port.

Figure 4:
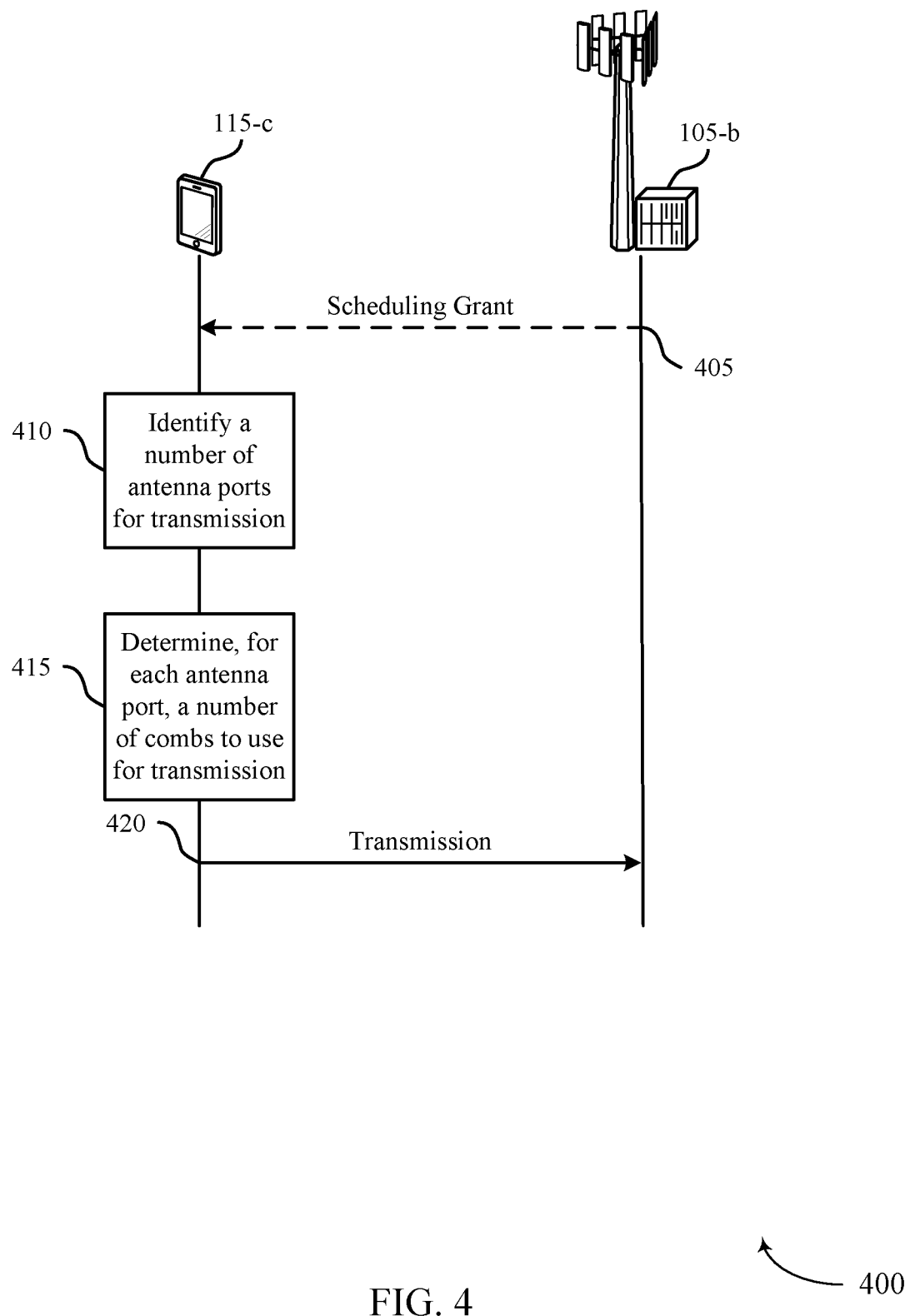
FIG. 4 illustrates an example of a process flow that supports flexible comb-based reference signals in accordance with aspects of the present disclosure.

FIG. 4 illustrates an example of a process flow 400 for flexible comb-based reference signals in accordance with various aspects of the present disclosure. Process flow 400 may include base station 105-*b* and UE 115-*c*, that may be examples of a base station 105 and a UE 115 as described herein with reference to FIGS. 1 through 3.

At 405, base station 105-*b* may transmit a scheduling grant to UE 115-*c*. The scheduling grant may include an antenna index and a comb index. In some cases, the scheduling grant may allocate a set of resources for UE 115-*c* to use for a reference signal transmission or may be based on base station 105-*b* a previously received scheduling request (e.g., from UE 115-*c*).

At 410, UE 115-*c* may identify a number of antenna ports for transmission of one or more reference signals. UE 115-*c* may transmit a different reference signal for each antenna port. In some cases, the reference signals may be DMRSs. UE 115-*c* may additionally identify a multiple-comb pattern to use for the transmission of the reference signals. The multiple-comb pattern may be an example of a flexible comb-based design. The multiple-comb pattern may include a number of combs, where each comb includes a set of subcarriers (i.e., tones) within a set of resources allocated for reference signal transmission. In some case, the set of resources may be allocated in the scheduling grant received by UE 115-*c*.

At 415, UE 115-*c* may determine, for each antenna port, a number of combs to use for transmission of one or more reference signals. The determination may be based on the identified number of antenna ports. The determination may additionally be based on the number of combs in the multiple-comb pattern. For example, UE 115-*c* may determine that the number of antenna ports is equal to the number of combs in the multiple-comb pattern or the UE 115-*c* may determine for each antenna port to use a single comb for transmission of the reference signal for that antenna port. In another example, UE 115-*c* may determine that the number of antenna ports is equal to one half of the number of combs in the multiple-comb pattern. UE 115-*c* may determine for each antenna port to use two combs for transmission of the reference signal for that antenna port. In yet another example, UE 115-*c* may determine that the number of antenna ports is equal to one (e.g., UE 115-*c* has a single antenna port). UE 115-*c* may determine to transmit the reference signal for the single antenna port over every comb of the multiple-comb pattern.

At 420, UE 115-*c* may transmit the one or more reference signals to base station 105-*b*. UE 115-*c* may transmit a reference signal of the one or more reference signals using each antenna port over the determined number of combs. In some cases, UE 115-*c* may include an indication of which antenna ports are transmitting over which combs. In other cases, UE 115-*c* may determine which combs for each antenna port to transmit over based on the antenna index or the comb index received in the scheduling grant from base station 105-*b*. Base station 105-*b* may perform channel estimation based on the reference signals received from UE 115-*c*.

Figure 5:
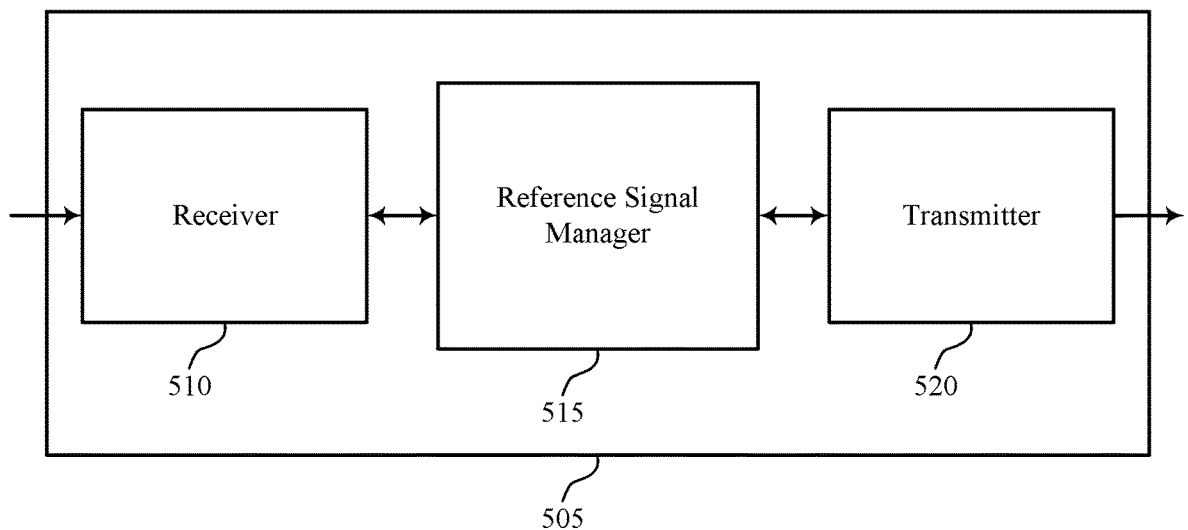
FIGS. 5 through 7 show block diagrams of a device that supports flexible comb-based reference signals in accordance with aspects of the present disclosure.

FIG. 5 shows a block diagram 500 of a wireless device 505 that supports flexible comb-based reference signals in accordance with various aspects of the present disclosure. Wireless device 505 may be an example of aspects of a base station 105 or a UE 115, as described with reference to FIGS. 1 through 4. Wireless device 505 may include receiver 510, reference signal manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to flexible comb-based reference signals, etc.). Information may be passed on to other components of the device. The receiver 510 may be an example of aspects of the transceiver 835 described with reference to FIG. 8.

Reference signal manager 515 may be an example of aspects of the reference signal manager 815 described with reference to FIG. 8.

Reference signal manager 515 and/or at least some of its various sub-components may be implemented in hardware, software executed by a processor, firmware, or any combination thereof. If implemented in software executed by a processor, the functions of the reference signal manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The reference signal manager 515 and/or at least some of its various sub-components may be physically located at various positions, including being distributed such that portions of functions are implemented at different physical locations by one or more physical devices. In some examples, reference signal manager 515 and/or at least some of its various sub-components may be a separate and distinct component in accordance with various aspects of the present disclosure. In other examples, reference signal manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Reference signal manager 515 may identify a number of antenna ports to use for transmission of one or more reference signals in a symbol having a multiple-comb pattern, each comb of the multiple-comb pattern including a set of subcarriers within a set of resources allocated for reference signal transmission. Reference signal manager 515 may determine, for each antenna port, a number of combs to use for transmission of at least one of the one or more reference signals based on the number of antenna ports. In some examples, reference signal manager 515 may transmit, using each antenna port, at least one of the one or more reference signals based on the determined number of combs.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
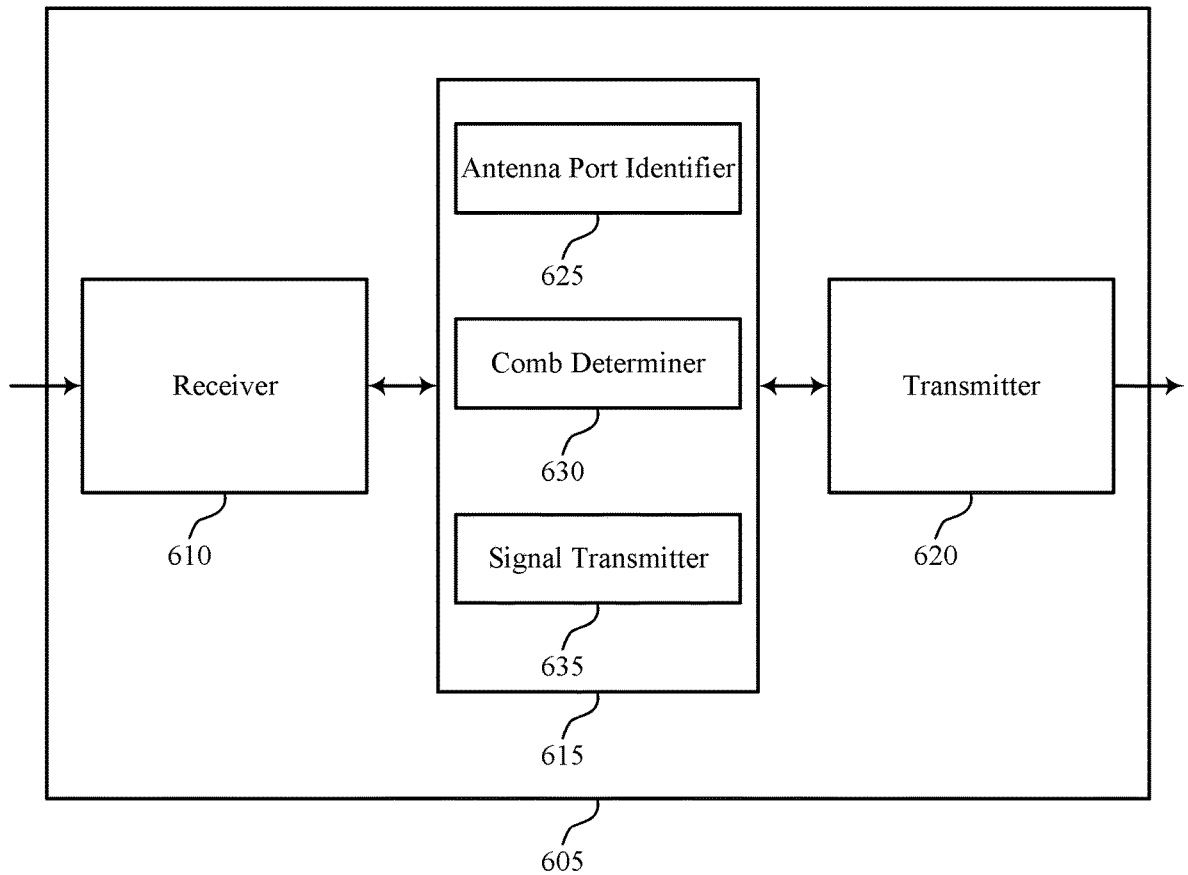

FIG. 6 shows a block diagram 600 of a wireless device 605 that supports flexible comb-based reference signals in accordance with various aspects of the present disclosure. Wireless device 605 may be an example of aspects of a wireless device 505, a base station 105, or a UE 115 as described with reference to FIGS. 1 through 5. Wireless device 605 may include receiver 610, reference signal manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to flexible comb-based reference signals, etc.). Information may be passed on to other components of the device. The receiver 610 may be an example of aspects of the transceiver 835 described with reference to FIG. 8.

Reference signal manager 615 may be an example of aspects of the reference signal manager 815 described with reference to FIG. 8. Reference signal manager 615 may also include antenna port identifier 625, comb determiner 630, and signal transmitter 635.

Antenna port identifier 625 may identify a number of antenna ports to use for transmission of one or more reference signals in a symbol having a multiple-comb pattern, each comb of the multiple-comb pattern including a set of subcarriers within a set of resources allocated for reference signal transmission.

Comb determiner 630 may determine, for each antenna port, a number of combs to use for transmission of at least one of the one or more reference signals based on the number of antenna ports. In some cases, a first set of subcarriers for a first comb of the multiple-comb pattern is non-overlapping with a second set of subcarriers for a second comb of the multiple-comb pattern. In some cases, the multiple-comb pattern includes multiple combs that are frequency multiplexed across one or more symbol periods.

Signal transmitter 635 may transmit, using each antenna port, at least one of the one or more reference signals based on the determined number of combs. In some examples, signal transmitter 635 may transmit at least one of the one or more reference signals based on the antenna index and the comb index. In some cases, transmitting the at least one of the one or more reference signals includes: transmitting, at a first antenna port, a first reference signal using a first comb of the multiple-comb pattern and transmitting, at a second antenna port, a second reference signal using a second comb of the multiple-comb pattern. In aspects, the first reference signal includes a first sub-sequence of a base sequence and the second reference signal includes a second sub-sequence of the base sequence. In some cases, the base sequence consists of the first sub-sequence and the second sub-sequence. In some aspects, transmitting the at least one of the one or more reference signals includes: transmitting a first reference signal using a subset of combs of the multiple-comb pattern.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
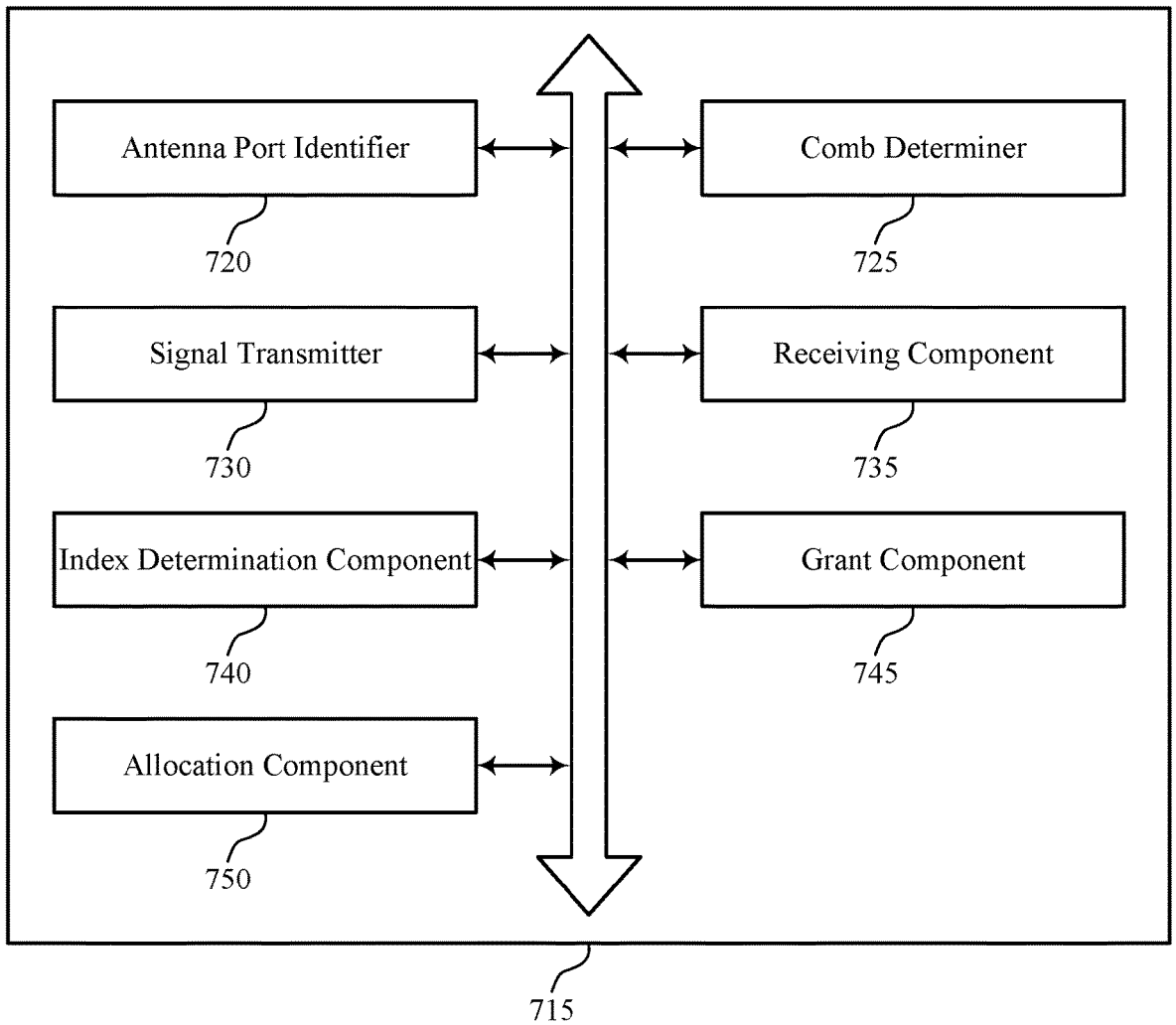

FIG. 7 shows a block diagram 700 of a reference signal manager 715 that supports flexible comb-based reference signals in accordance with various aspects of the present disclosure. The reference signal manager 715 may be an example of aspects of a reference signal manager 515, a reference signal manager 615, or a reference signal manager 815 described with reference to FIGS. 5, 6, and 8. The reference signal manager 715 may include antenna port identifier 720, comb determiner 725, signal transmitter 730, receiving component 735, index determination component 740, grant component 745, and allocation component 750. Each of these modules may communicate, directly or indirectly, with one another (e.g., via one or more buses).

Antenna port identifier 720 may identify a number of antenna ports to use for transmission of one or more reference signals in a symbol having a multiple-comb pattern, each comb of the multiple-comb pattern including a set of subcarriers within a set of resources allocated for reference signal transmission.

Comb determiner 725 may determine, for each antenna port, a number of combs to use for transmission of at least one of the one or more reference signals based on the number of antenna ports. In some cases, a first set of subcarriers for a first comb of the multiple-comb pattern is non-overlapping with a second set of subcarriers for a second comb of the multiple-comb pattern. In some cases, the multiple-comb pattern includes multiple combs that are frequency multiplexed across one or more symbol periods.

Signal transmitter 730 may transmit, using each antenna port, at least one of the one or more reference signals based on the determined number of combs. In some examples, signal transmitter 730 may transmit at least one of the one or more reference signals based on the antenna index and the comb index. In some cases, transmitting the at least one of the one or more reference signals includes: transmitting, at a first antenna port, a first reference signal using a first comb of the multiple-comb pattern and transmitting, at a second antenna port, a second reference signal using a second comb of the multiple-comb pattern. In aspects, the first reference signal includes a first sub-sequence of a base sequence and the second reference signal includes a second sub-sequence of the base sequence. In some cases, the base sequence consists of the first sub-sequence and the second sub-sequence. In some aspects, transmitting the at least one of the one or more reference signals includes: transmitting a first reference signal using a subset of combs of the multiple-comb pattern.

Receiving component 735 may receive (e.g., from a base station) a scheduling grant including an antenna index and a comb index. Index determination component 740 may determine an antenna index and a comb index (e.g., for a UE). Grant component 745 may transmit (e.g., to a UE) a scheduling grant including the antenna index and the comb index.

Allocation component 750 may allocate every other comb of the multiple-comb pattern to a respective antenna port, allocate each comb of the multiple-comb pattern to a respective antenna port, allocate every comb of the multiple-comb pattern to a single antenna port, and/or allocate the set of resources to multiple UEs including a first UE and a second UE different from the first UE. In some cases, the allocation component 750 may transmit the at least one of the one or more reference signals based on the allocating. In some examples, transmitting the at least one of the one or more reference signals includes: determining that the number of antenna ports is equal to a number of combs in the multiple-comb pattern. In some aspects, a determined number of combs for each antenna port of the first UE is equal to or different from a determined number of combs for each antenna port of the second UE. In some cases, transmitting the at least one of the one or more reference signals includes: determining that the number of antenna ports is equal to one half of a number of combs in the multiple-comb pattern. In some examples, transmitting the at least one of the one or more reference signals includes: determining that the number of antenna ports is equal to one.

Figure 8:
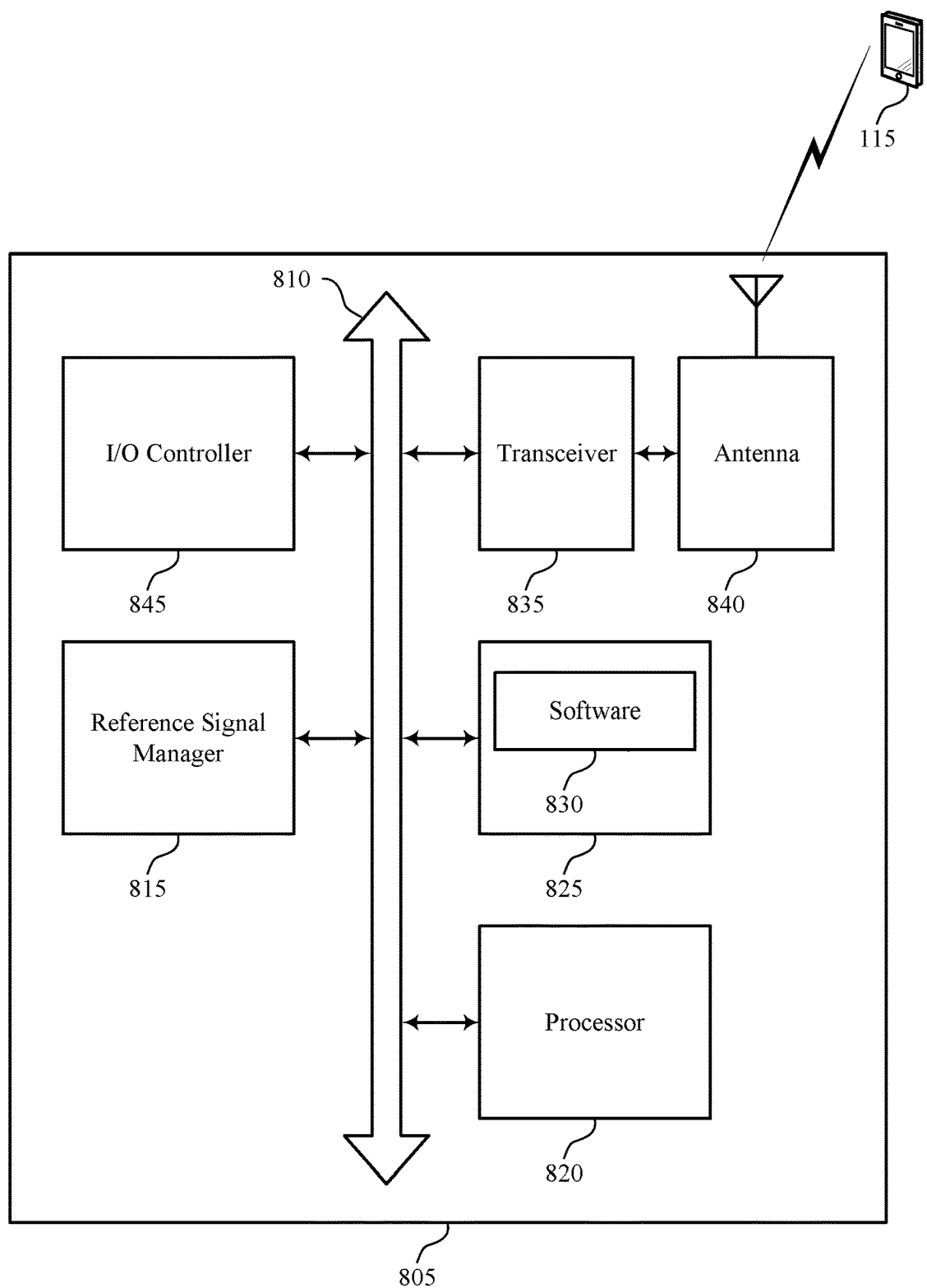
FIG. 8 illustrates a block diagram of a system including a wireless device that supports flexible comb-based reference signals in accordance with aspects of the present disclosure.

FIG. 8 shows a diagram of a system 800 including a device 805 that supports flexible comb-based reference signals in accordance with various aspects of the present disclosure. Device 805 may be an example of or include the components of wireless device 505, wireless device 605, a base station 105, or a UE 115 as described above, e.g., with reference to FIGS. 1 through 6. Device 805 may include components for bi-directional voice and data communications including components for transmitting and receiving communications, including reference signal manager 815, processor 820, memory 825, software 830, transceiver 835, antenna 840, and I/O controller 845. These components may be in electronic communication via one or more busses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting flexible comb-based reference signals).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) that may control basic hardware and/or software operation such as the interaction with peripheral components or devices.

Software 830 may include code to implement aspects of the present disclosure, including code to support flexible comb-based reference signals. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, that may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
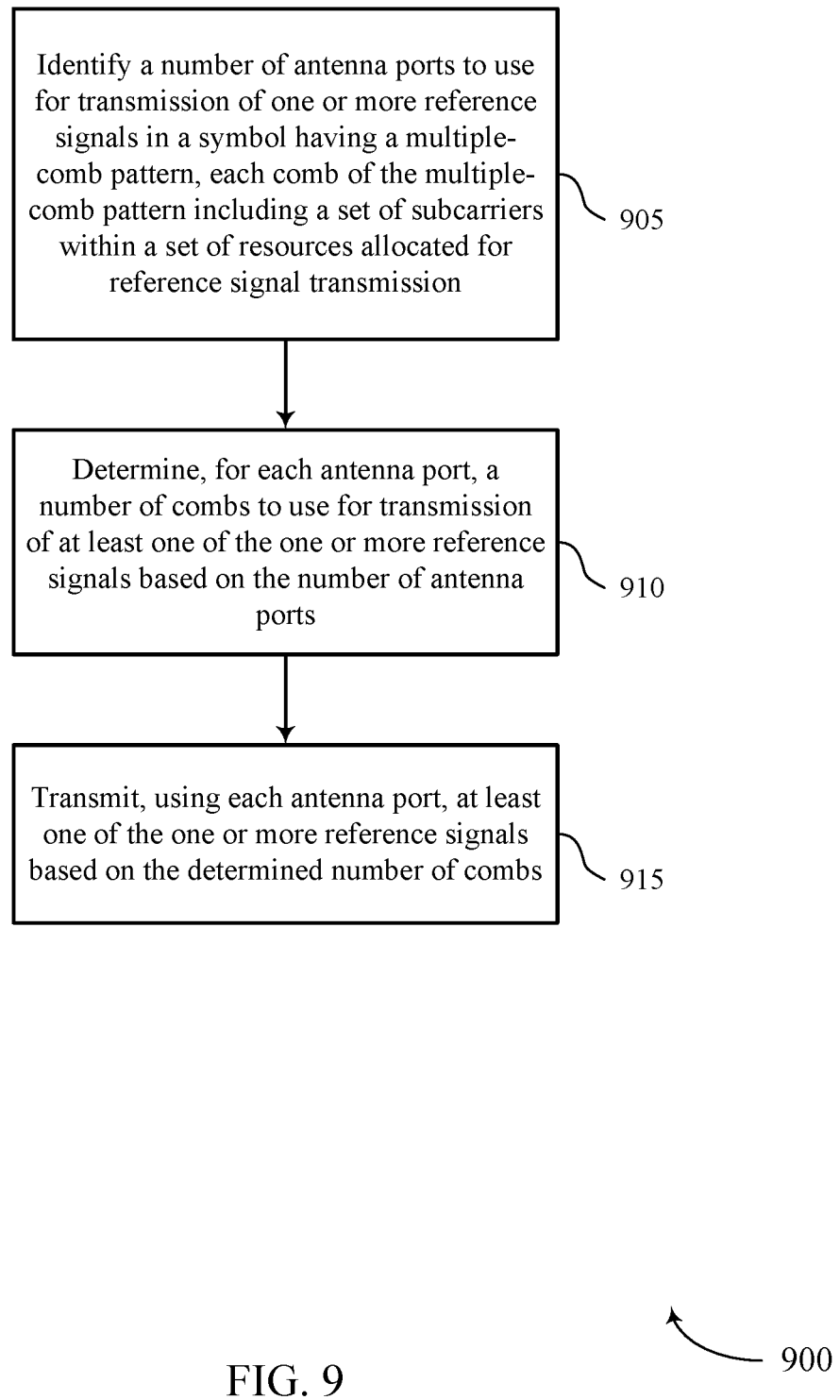
FIGS. 9 through 11 illustrate methods for flexible comb-based reference signals in accordance with aspects of the present disclosure.

FIG. 9 shows a flowchart illustrating a method 900 for flexible comb-based reference signals in accordance with various aspects of the present disclosure. The operations of method 900 may be implemented by a base station 105, a UE 115, or their components as described herein. For example, the operations of method 900 may be performed by a reference signal manager as described with reference to FIGS. 5 through 8. In some examples, a base station 105 or a UE 115 may execute a set of codes to control the functional elements of the device to perform the functions described below. Additionally or alternatively, the base station 105 or a UE 115 may perform aspects of the functions described below using special-purpose hardware.

At block 905 the base station 105 or the UE 115 may identify a number of antenna ports to use for transmission of one or more reference signals in a symbol having a multiple-comb pattern, each comb of the multiple-comb pattern comprising a set of subcarriers within a set of resources allocated for reference signal transmission. The operations of block 905 may be performed according to the methods described with reference to FIGS. 1 through 4. In certain examples, aspects of the operations of block 905 may be performed by an antenna port identifier as described with reference to FIGS. 5 through 8.

At block 910 the base station 105 or the UE 115 may determine, for each antenna port, a number of combs to use for transmission of at least one of the one or more reference signals based at least in part on the number of antenna ports. The operations of block 910 may be performed according to the methods described with reference to FIGS. 1 through 4. In certain examples, aspects of the operations of block 910 may be performed by a comb determiner as described with reference to FIGS. 5 through 8.

At block 915 the base station 105 or the UE 115 may transmit, using each antenna port, at least one of the one or more reference signals based at least in part on the determined number of combs. The operations of block 915 may be performed according to the methods described with reference to FIGS. 1 through 4. In certain examples, aspects of the operations of block 915 may be performed by a signal transmitter as described with reference to FIGS. 5 through 8.

Figure 10:
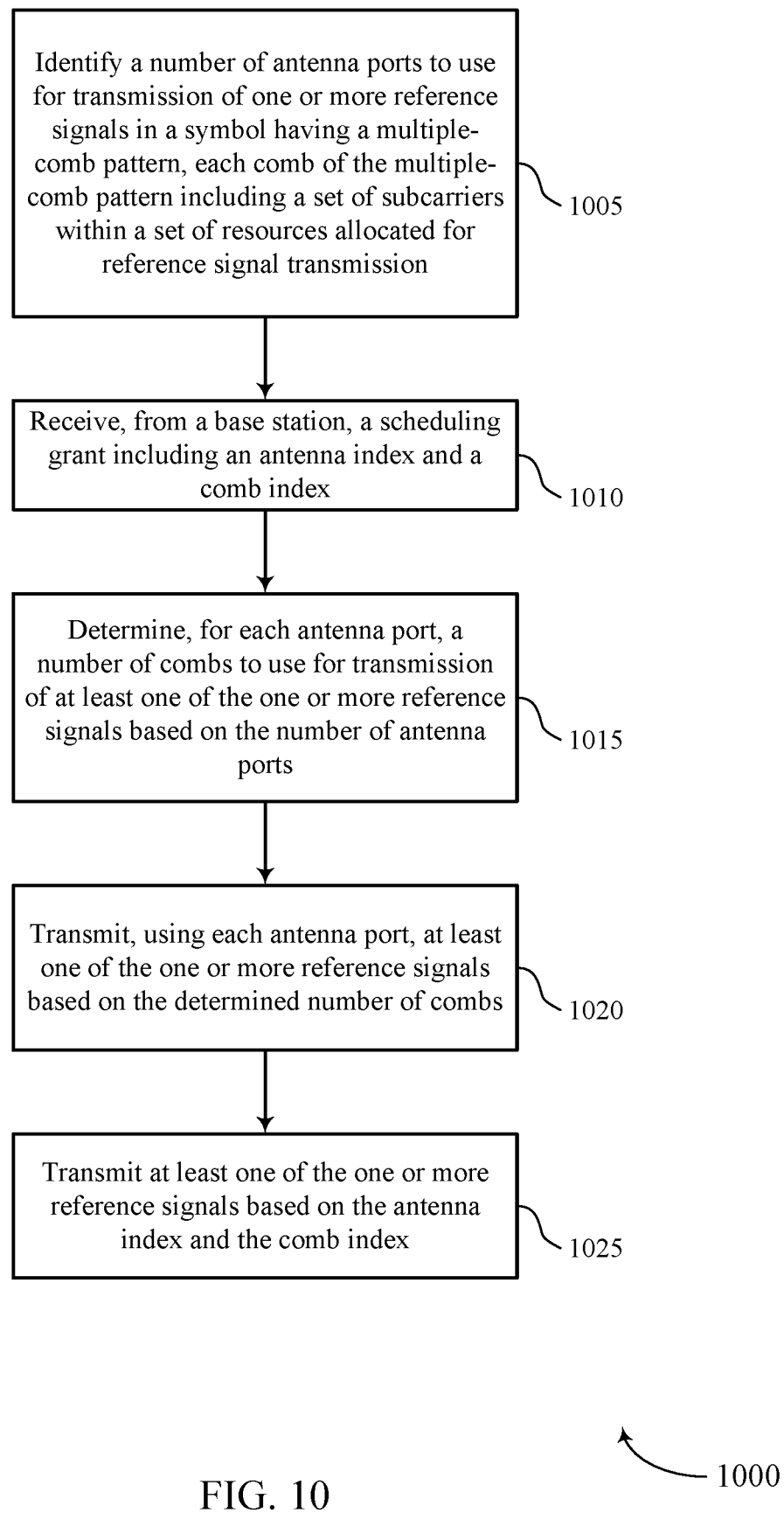

FIG. 10 shows a flowchart illustrating a method 1000 for flexible comb-based reference signals in accordance with various aspects of the present disclosure. The operations of method 1000 may be implemented by a UE 115 or its components as described herein. For example, the operations of method 1000 may be performed by a reference signal manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1005 the UE 115 may identify a number of antenna ports to use for transmission of one or more reference signals in a symbol having a multiple-comb pattern, each comb of the multiple-comb pattern comprising a set of subcarriers within a set of resources allocated for reference signal transmission. The operations of block 1005 may be performed according to the methods described with reference to FIGS. 1 through 4. In certain examples, aspects of the operations of block 1005 may be performed by an antenna port identifier as described with reference to FIGS. 5 through 8.

At block 1010 the UE 115 may receive, from a base station, a scheduling grant comprising an antenna index and a comb index. The operations of block 1010 may be performed according to the methods described with reference to FIGS. 1 through 4. In certain examples, aspects of the operations of block 1010 may be performed by a receiving component as described with reference to FIGS. 5 through 8.

At block 1015 the UE 115 may determine, for each antenna port, a number of combs to use for transmission of at least one of the one or more reference signals based at least in part on the number of antenna ports. The operations of block 1015 may be performed according to the methods described with reference to FIGS. 1 through 4. In certain examples, aspects of the operations of block 1015 may be performed by a comb determiner as described with reference to FIGS. 5 through 8.

At block 1020 the UE 115 may transmit, using each antenna port, at least one of the one or more reference signals based at least in part on the determined number of combs. The operations of block 1020 may be performed according to the methods described with reference to FIGS. 1 through 4. In certain examples, aspects of the operations of block 1020 may be performed by a signal transmitter as described with reference to FIGS. 5 through 8.

At block 1025 the UE 115 may transmit at least one of the one or more reference signals based at least in part on the antenna index and the comb index. The operations of block 1025 may be performed according to the methods described with reference to FIGS. 1 through 4. In certain examples, aspects of the operations of block 1025 may be performed by a signal transmitter as described with reference to FIGS. 5 through 8.

Figure 11:
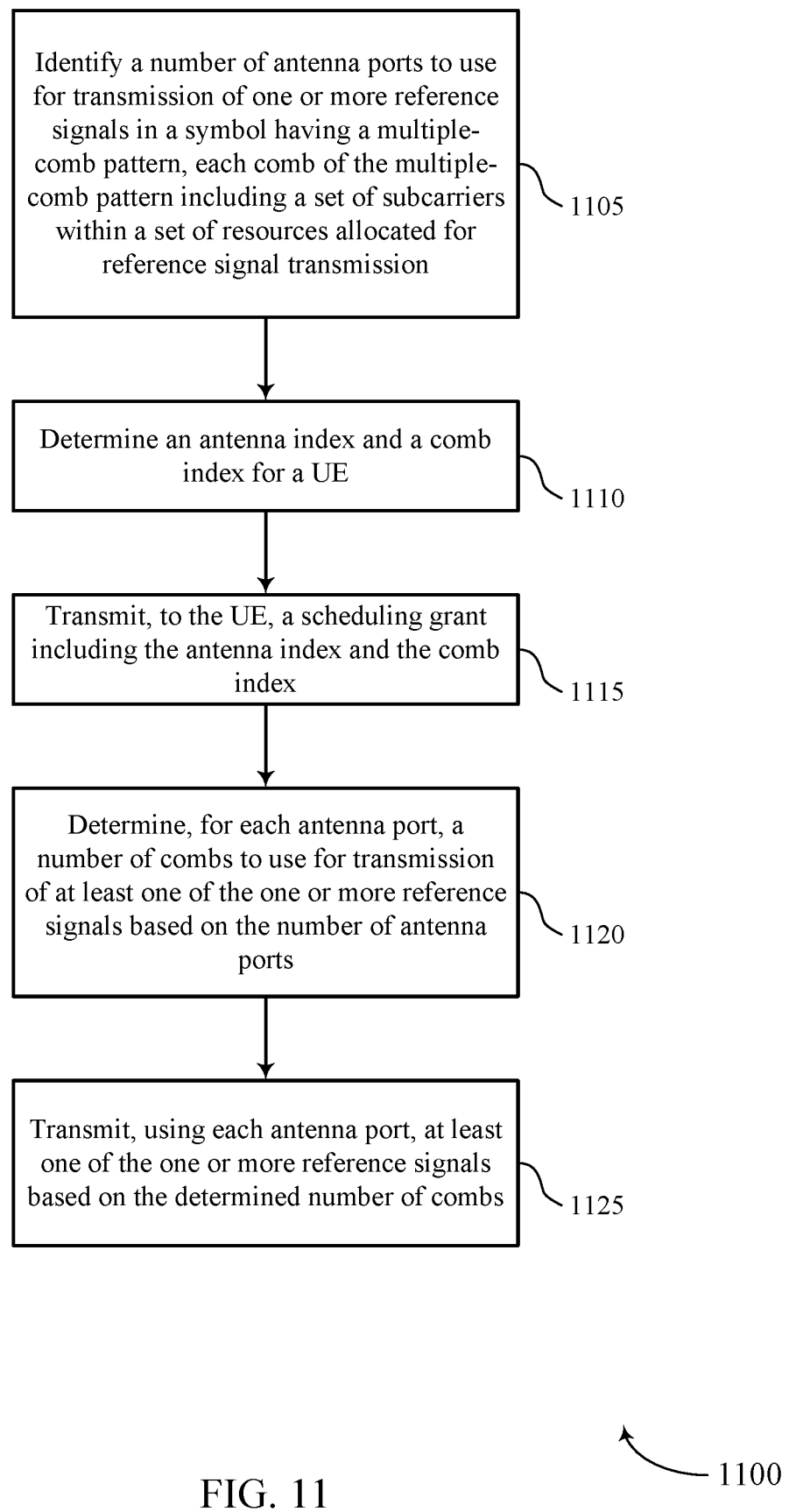

FIG. 11 shows a flowchart illustrating a method 1100 for flexible comb-based reference signals in accordance with various aspects of the present disclosure. The operations of method 1100 may be implemented by a base station 105 or its components as described herein. For example, the operations of method 1100 may be performed by a reference signal manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1105 the base station 105 may identify a number of antenna ports to use for transmission of one or more reference signals in a symbol having a multiple-comb pattern, each comb of the multiple-comb pattern comprising a set of sub carriers within a set of resources allocated for reference signal transmission. The operations of block 1105 may be performed according to the methods described with reference to FIGS. 1 through 4. In certain examples, aspects of the operations of block 1105 may be performed by an antenna port identifier as described with reference to FIGS. 5 through 8.

At block 1110 the base station 105 may determine an antenna index and a comb index for a UE. The operations of block 1110 may be performed according to the methods described with reference to FIGS. 1 through 4. In certain examples, aspects of the operations of block 1110 may be performed by an index determination component as described with reference to FIGS. 5 through 8.

At block 1115 the base station 105 may transmit, to the UE, a scheduling grant comprising the antenna index and the comb index. The operations of block 1115 may be performed according to the methods described with reference to FIGS. 1 through 4. In certain examples, aspects of the operations of block 1115 may be performed by a grant component as described with reference to FIGS. 5 through 8.

At block 1120 the base station 105 may determine, for each antenna port, a number of combs to use for transmission of at least one of the one or more reference signals based at least in part on the number of antenna ports. The operations of block 1120 may be performed according to the methods described with reference to FIGS. 1 through 4. In certain examples, aspects of the operations of block 1120 may be performed by a comb determiner as described with reference to FIGS. 5 through 8.

At block 1125 the base station 105 may transmit, using each antenna port, at least one of the one or more reference signals based at least in part on the determined number of combs. The operations of block 1125 may be performed according to the methods described with reference to FIGS. 1 through 4. In certain examples, aspects of the operations of block 1125 may be performed by a signal transmitter as described with reference to FIGS. 5 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). 3GPP LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying a number of antenna ports to use for transmission of one or more reference signals in a symbol having a multiple-comb pattern, each comb of the multiple-comb pattern comprising a set of subcarriers within a set of resources allocated for reference signal transmission;
    determining, for each antenna port, a number of combs to use for transmission of at least one of the one or more reference signals based at least in part on the number of antenna ports; and
    transmitting, using each antenna port, at least one of the one or more reference signals based at least in part on the determined number of combs.

2. The method of claim 1, further comprising:
    receiving, from a base station, a scheduling grant comprising an antenna index and a comb index; and
    transmitting at least one of the one or more reference signals based at least in part on the antenna index and the comb index.

3. The method of claim 1, further comprising:
    determining an antenna index and a comb index for a user equipment (UE); and
    transmitting, to the UE, a scheduling grant comprising the antenna index and the comb index.

4. The method of claim 1, wherein transmitting the at least one of the one or more reference signals comprises:
    determining that the number of antenna ports is equal to a total number of combs in the multiple-comb pattern;
    allocating each comb of the multiple-comb pattern to a respective antenna port; and
    transmitting the at least one of the one or more reference signals based at least in part on the allocating.

5. The method of claim 1, wherein transmitting the at least one of the one or more reference signals comprises:
    determining that the number of antenna ports is equal to one half of a total number of combs in the multiple-comb pattern;
    allocating every other comb of the multiple-comb pattern to a respective antenna port; and
    transmitting the at least one of the one or more reference signals based at least in part on the allocating.

6. The method of claim 1, wherein transmitting the at least one of the one or more reference signals comprises:
    determining that the number of antenna ports is equal to one;
    allocating every comb of the multiple-comb pattern to a single antenna port; and
    transmitting the at least one of the one or more reference signals based at least in part on the allocating.

7. The method of claim 1, wherein transmitting the at least one of the one or more reference signals comprises:
    transmitting, at a first antenna port, a first reference signal using a first comb of the multiple-comb pattern; and
    transmitting, at a second antenna port, a second reference signal using a second comb of the multiple-comb pattern.

8. The method of claim 7, wherein:
    the first reference signal comprises a first sub-sequence of a base sequence and the second reference signal comprises a second sub-sequence of the base sequence.

9. The method of claim 8, wherein:
    the base sequence consists of the first sub-sequence and the second sub-sequence.

10. The method of claim 1, wherein transmitting the at least one of the one or more reference signals comprises:
    transmitting a first reference signal using a subset of combs of the multiple-comb pattern.

11. The method of claim 1, wherein:
    a first set of subcarriers for a first comb of the multiple-comb pattern is non-overlapping with a second set of subcarriers for a second comb of the multiple-comb pattern.

12. The method of claim 1, wherein:
    the multiple-comb pattern comprises multiple combs that are frequency multiplexed across one or more symbol periods.

13. The method of claim 1, further comprising:
    allocating the set of resources to multiple UEs including a first UE and a second UE different from the first UE.

14. The method of claim 13, wherein:
    a determined number of combs for each antenna port of the first UE is equal to or different from a determined number of combs for each antenna port of the second UE.

15. An apparatus for wireless communication, comprising:
    a processor;
    memory in electronic communication with the processor; and
    instructions stored in the memory and operable, when executed by the processor, to cause the apparatus to:
    identify a number of antenna ports to use for transmission of one or more reference signals in a symbol having a multiple-comb pattern, each comb of the multiple-comb pattern comprising a set of subcarriers within a set of resources allocated for reference signal transmission;

determine, for each antenna port, a number of combs to use for transmission of at least one of the one or more reference signals based at least in part on the number of antenna ports; and transmit, using each antenna port, at least one of the one or more reference signals based at least in part on the determined number of combs.

16. The apparatus of claim 15, wherein the instructions are further executable by the processor to:
receive, from a base station, a scheduling grant comprising an antenna index and a comb index; and
transmit at least one of the one or more reference signals based at least in part on the antenna index and the comb index.

17. The apparatus of claim 15, wherein the instructions are further executable by the processor to:
determine an antenna index and a comb index for a user equipment (UE); and
transmit, to the UE, a scheduling grant comprising the antenna index and the comb index.

18. The apparatus of claim 15, wherein the instructions are further executable by the processor to:
determine that the number of antenna ports is equal to a total number of combs in the multiple-comb pattern;
allocate each comb of the multiple-comb pattern to a respective antenna port; and
transmit the at least one of the one or more reference signals based at least in part on the allocating.

19. The apparatus of claim 15, wherein the instructions are further executable by the processor to:
determining that the number of antenna ports is equal to one half of a total number of combs in the multiple-comb pattern;
allocate every other comb of the multiple-comb pattern to a respective antenna port; and
transmit the at least one of the one or more reference signals based at least in part on the allocating.

20. The apparatus of claim 15, wherein the instructions are further executable by the processor to:
determine that the number of antenna ports is equal to one;
allocate every comb of the multiple-comb pattern to a single antenna port; and
transmit the at least one of the one or more reference signals based at least in part on the allocating.

21. The apparatus of claim 15, wherein the instructions are further executable by the processor to:
transmit, at a first antenna port, a first reference signal using a first comb of the multiple-comb pattern; and
transmit, at a second antenna port, a second reference signal using a second comb of the multiple-comb pattern.

22. The apparatus of claim 21, wherein:
the first reference signal comprises a first sub-sequence of a base sequence and the second reference signal comprises a second sub-sequence of the base sequence.

23. The apparatus of claim 22, wherein:
the base sequence consists of the first sub-sequence and the second sub-sequence.

24. The apparatus of claim 15, wherein the instructions are further executable by the processor to:
transmit a first reference signal using a subset of combs of the multiple-comb pattern.

25. The apparatus of claim 15, wherein:
a first set of subcarriers for a first comb of the multiple-comb pattern is non-overlapping with a second set of subcarriers for a second comb of the multiple-comb pattern.

26. The apparatus of claim 15, wherein:
the multiple-comb pattern comprises multiple combs that are frequency multiplexed across one or more symbol periods.

27. The apparatus of claim 15, wherein the instructions are further executable by the processor to:
allocate the set of resources to multiple UEs including a first UE and a second UE different from the first UE.

28. The apparatus of claim 27, wherein:
a determined number of combs for each antenna port of the first UE is equal to or different from a determined number of combs for each antenna port of the second UE.

29. An apparatus for wireless communication, comprising:
means for identifying a number of antenna ports to use for transmission of one or more reference signals in a symbol having a multiple-comb pattern, each comb of the multiple-comb pattern comprising a set of subcarriers within a set of resources allocated for reference signal transmission;
means for determining, for each antenna port, a number of combs to use for transmission of at least one of the one or more reference signals based at least in part on the number of antenna ports; and
means for transmitting, using each antenna port, at least one of the one or more reference signals based at least in part on the determined number of combs.

30. A non-transitory computer readable medium storing code for wireless communication, the code comprising instructions executable by a processor to:
identify a number of antenna ports to use for transmission of one or more reference signals in a symbol having a multiple-comb pattern, each comb of the multiple-comb pattern comprising a set of subcarriers within a set of resources allocated for reference signal transmission;
determine, for each antenna port, a number of combs to use for transmission of at least one of the one or more reference signals based at least in part on the number of antenna ports; and
transmit, using each antenna port, at least one of the one or more reference signals based at least in part on the determined number of combs.

* * * * *